US011108921B2

(12) United States Patent
Asai

(10) Patent No.: US 11,108,921 B2
(45) Date of Patent: Aug. 31, 2021

(54) STORAGE MEDIUM STORING CREATION AND TRANSMISSION PROGRAMS, AND INFORMATION PROCESSING APPARATUS FOR CREATING SECOND IMAGE DATA BASED ON FIRST IMAGE DATA ACCORDING TO SPECIFICATION INFORMATION OF IMAGE PROCESSING DEVICE

(71) Applicant: BROTHER KOGYO KABUSHIKI KAISHA, Nagoya (JP)

(72) Inventor: Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/821,455

(22) Filed: Mar. 17, 2020

(65) Prior Publication Data
US 2020/0314259 A1    Oct. 1, 2020

(30) Foreign Application Priority Data

Mar. 25, 2019  (JP) ............................. JP2019-056358

(51) Int. Cl.
*G06F 3/0482* (2013.01)
*H04N 1/00* (2006.01)
(Continued)

(52) U.S. Cl.
CPC ....... *H04N 1/00233* (2013.01); *G06F 3/0482* (2013.01); *G06F 16/535* (2019.01);
(Continued)

(58) Field of Classification Search
None
See application file for complete search history.

(56) References Cited

U.S. PATENT DOCUMENTS

| 7,161,694 B2* | 1/2007 | Saka | .................. H04N 1/00127 |
| | | | 358/1.1 |
| 2011/0069341 A1* | 3/2011 | Kim | ...................... G06F 3/1204 |
| | | | 358/1.15 |

(Continued)

FOREIGN PATENT DOCUMENTS

| JP | 2012-203742 A | 10/2012 |
| JP | 2015-203956 A | 11/2015 |

(Continued)

*Primary Examiner* — Haris Sabah
(74) *Attorney, Agent, or Firm* — Scully, Scott, Murphy & Presser, PC

(57) ABSTRACT

A non-transitory computer-readable storage medium stores a creation program including a set of instructions readable by a computer of an information processing apparatus. The set of instructions, when executed by the computer, causes the information processing apparatus to perform: receiving, from a transmission program, specification information indicative of a specification of an image processing device configured to communicate with the information processing apparatus, the transmission program being readable by the computer and being different from the creation program; creating image data corresponding to the specification information received from the transmission program; and outputting the image data to the transmission program, the transmission program being configured to transmit the image data to the image processing device.

16 Claims, 8 Drawing Sheets

(51) Int. Cl.
  *G06F 16/538* (2019.01)
  *G06F 16/535* (2019.01)
  *G06F 3/12* (2006.01)

(52) U.S. Cl.
  CPC ....... *G06F 16/538* (2019.01); *H04N 1/00411* (2013.01); *G06F 3/1231* (2013.01); *G06F 3/1255* (2013.01); *G06F 3/1297* (2013.01)

(56) References Cited

U.S. PATENT DOCUMENTS

| | | | |
|---|---|---|---|
| 2012/0133977 A1* | 5/2012 | Sunata | G06K 15/007 358/1.15 |
| 2012/0243043 A1 | 9/2012 | Asai | |
| 2013/0335774 A1* | 12/2013 | Kato | H04N 1/0097 358/1.15 |
| 2014/0055799 A1* | 2/2014 | Nakagawa | G06F 3/1257 358/1.13 |
| 2015/0146245 A1* | 5/2015 | Asai | H04N 1/32459 358/1.15 |
| 2016/0094727 A1* | 3/2016 | Sawada | H04N 1/41 358/1.15 |
| 2016/0216926 A1* | 7/2016 | Watanabe | G06F 3/1204 |
| 2017/0048416 A1* | 2/2017 | Cho | G06F 3/1288 |
| 2018/0077300 A1 | 3/2018 | Asai | |
| 2019/0104224 A1 | 4/2019 | Asai | |

FOREIGN PATENT DOCUMENTS

| | | |
|---|---|---|
| JP | 2017-117293 A | 6/2017 |
| JP | 2018-45495 A | 3/2018 |
| JP | 2019-67000 A | 4/2019 |

\* cited by examiner

STORAGE MEDIUM STORING CREATION AND TRANSMISSION PROGRAMS, AND INFORMATION PROCESSING APPARATUS FOR CREATING SECOND IMAGE DATA BASED ON FIRST IMAGE DATA ACCORDING TO SPECIFICATION INFORMATION OF IMAGE PROCESSING DEVICE

CROSS REFERENCE TO RELATED APPLICATIONS

This application claims priority from Japanese Patent Application No. 2019-056358 filed Mar. 25, 2019. The entire content of the priority application is incorporated herein by reference.

TECHNICAL FIELD

This disclosure relates to a creation program and a transmission program both of which are readable by a computer of an information processing apparatus configured to communicate with an image processing device. This disclosure also relates to an information processing apparatus.

BACKGROUND

In an information processing apparatus configured to communicate with an image processing device, image data needs to be created depending on specification information indicative of the specification of a device that performs image processing.

SUMMARY

According to one aspect, this specification discloses a non-transitory computer-readable storage medium storing a creation program including a set of instructions readable by a computer of an information processing apparatus. The set of instructions, when executed by the computer, causes the information processing apparatus to perform: receiving, from a transmission program, specification information indicative of a specification of an image processing device configured to communicate with the information processing apparatus, the transmission program being readable by the computer and being different from the creation program; creating image data corresponding to the specification information received from the transmission program; and outputting the image data to the transmission program, the transmission program being configured to transmit the image data to the image processing device.

According to another aspect, this specification also discloses a non-transitory computer-readable storage medium storing a transmission program including a set of instructions readable by a computer of an information processing apparatus. The set of instructions, when executed by the computer, causes the information processing apparatus to perform: outputting, to a creation program, specification information indicative of a specification of an image processing device configured to communicate with the information processing apparatus, the creation program being readable by the computer and being different from the transmission program, the creation program being for creating image data to be transmitted to the image processing device; receiving image data from the creation program, the image data being created by the creation program by using the specification information; and transmitting the image data to the image processing device.

According to still another aspect, this specification also discloses an information processing apparatus. The information processing apparatus includes a communication interface configured to communicate with an image processing device, a user interface, a controller, and a memory storing a transmission program and a creation program different from each other. Each of the transmission program and the creation program includes instructions. The instructions, when executed by the controller, cause the information processing apparatus to perform: outputting, from the transmission program to the creation program, specification information indicative of a specification of the image processing device; receiving, by the creation program, the specification information; creating, by the creation program, image data corresponding to the specification information received from the transmission program; outputting the image data from the creation program to the transmission program; receiving, by the transmission program, the image data that is created and outputted by the creation program; and transmitting the image data from the transmission program to the image processing device through the communication interface.

BRIEF DESCRIPTION OF THE DRAWINGS

Embodiments in accordance with this disclosure will be described in detail with reference to the following figures wherein.

DETAILED DESCRIPTION

An object of this disclosure is to adequately create image data depending on specification information indicative of the specification of an image processing device.

Figure 1:
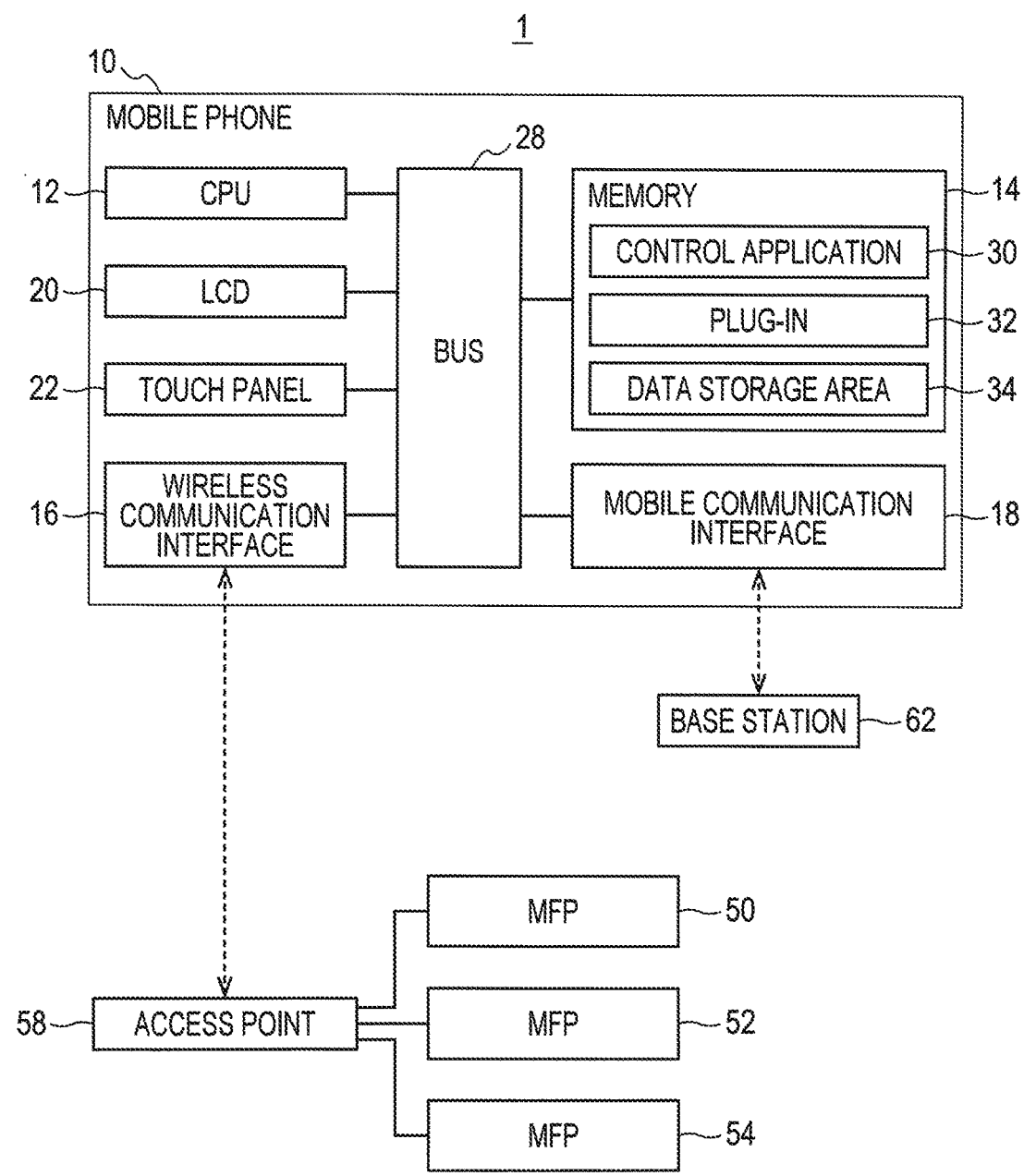
FIG. 1 is a block diagram of a communication system 1.

As shown in FIG. 1, the communication system 1 includes a mobile phone (an example of an information processing apparatus) 10, MFPs (an example of an image processing device) 50, 52, and 54, an access point 58, and a base station 62. Each of the MFPs 50, 52, and 54 is a device configured to perform various processing such as printing and scanning but having different specification for printing. In other words, the MFP 50 is configured to perform full-color printing, two-color printing, and monochromatic printing; the MFP 52 is configured to perform two-color printing and monochromatic printing; and the MFP 54 is configured to perform monochromatic printing only. The access point 58 has functions as a wireless LAN and a router.

The mobile phone 10 mainly includes a CPU (an example of a computer) 12, a memory 14, a wireless communication interface (an example of a communication interface) 16, a mobile communication interface 18, an LCD (an example of a display interface) 20, and a touch panel 22. These components are configured to mutually communicate through a bus 28.

The wireless communication interface 16 performs wireless communication in Wi-Fi™ method based on the IEEE standard 802.11 and other equivalent standards. In other words, the mobile phone 10 accesses the access point 58 and, when the wireless communication in Wi-Fi method becomes possible, the mobile phone 10 is ready to perform data communication with the MFPs 50, 52, and 54 through the access point 58.

The mobile communication interface 18 performs wireless communication with the base station 62 in a mobile communication method. In other words, the mobile phone 10 is configured to perform data communication through the base station 62 when the wireless communication in the mobile communication method becomes possible.

The CPU 12 executes processing in accordance with a control application (an example of a transmission program) 30 in the memory 14 or a plug-in (an example of a creation program) 32. The control application 30 is a program for allowing the MFPs 50, 52, 54 to perform various processing by using the mobile phone 10. The plug-in 32 is a program for adding a new function to the control application 30. Specifically, the plug-in 32 is a program for creating particular image data and allowing the MFPs 50, 52, 54 to perform particular processing. Note that the CPU 12 executing the control application 30 may be simply called by the program name. For example, the description "the control application 30" may mean "the CPU 12 executing the control application 30".

The memory 14 has a data storage area 34. The data storage area 34 is an area for storing data necessary for executing the control application 30 and the like. The memory 14 is a combination of a RAM, a ROM, a flash memory, an HDD, and a buffer stored in the CPU 12. The memory 14 may be a computer-readable storage medium. The computer-readable storage medium means a non-transitory medium; apart from the above-described examples, the non-transitory medium includes a CD-ROM and a DVD-ROM. The non-transitory medium is also a tangible medium. On the other hand, an electrical signal transmitting a program downloaded from a server or the like on the Internet is also a computer-readable signal medium as a type of computer-readable medium, however it is not included in the non-transitory computer readable storage medium.

The LCD 20 has a display for showing various functions of the mobile phone 10. The touch panel 22 has a touch sensor and placed so as to cover the display of the LCD 20. The touch panel 22 detects users' fingers and touch pen approaching or touching the touch panel 22 and then outputs an electrical signal in response to the detection.

Note that this specification mainly describes the processing of the CPU 12 in accordance with the command written in the program. In other words, the below-described processing such as "determination", "extraction", "selection", "calculation", "decision", "identification", "acquisition", "reception", "control" means the type of processing by the CPU 12. The processing by the CPU 12 includes hardware control through the OS. It should also be noted that the term "acquisition" is a concept which does not require "requesting". In other words, a processing to receive data without request from the CPU 12 is also included within the concept that "the CPU 12 receives data". In addition, the term "data" in this description is represented by computer-readable bit strings. The data of which meaning is substantially the same, but the format is different is treated as an identical data. The term "information" in this description is treated in the same manner as the term "data". The processing such as "command", "response", and "request" is executed by communicating information indicating "command", "response", and "request". The processing such as "setting" is executed by storing the inputted setting information into the memory.

As for the communication system 1, in the mobile phone 10, the plug-in 32 creates image data and the control application 30 transmits the image data to the MFPs 50, 52, 54 so as to perform printing by the MFPs 50, 52, 54. Note that, as described above, since printing specification for each of the MFPs 50, 52, 54 is different, the plug-in 32 is configured to create image data corresponding to the specification of the device that performs print processing.

Figure 2:
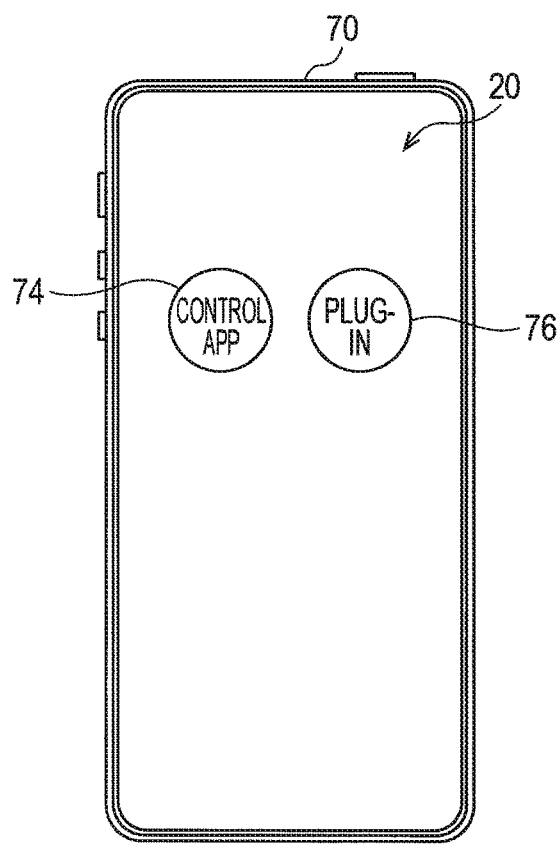
FIG. 2 is a view showing a home screen 70.

Specifically, in the mobile phone 10, a home screen 70 (FIG. 2) is shown on the LCD 20 by the processing of an OS (not shown). On the home screen 70, a first select button 74 and a second select button 76 is displayed. The first select button 74 is for starting the control application 30 and the second select button 76 is for starting the plug-in 32. In the mobile phone 10, an operation of either one of the first select button 74 or the second select button 76 causes image data to be created by the plug-in 32, then the image data is transmitted to the MFP by the control application 30. Firstly, a case of the first select button 74 being operated will be described below.

Figure 3:
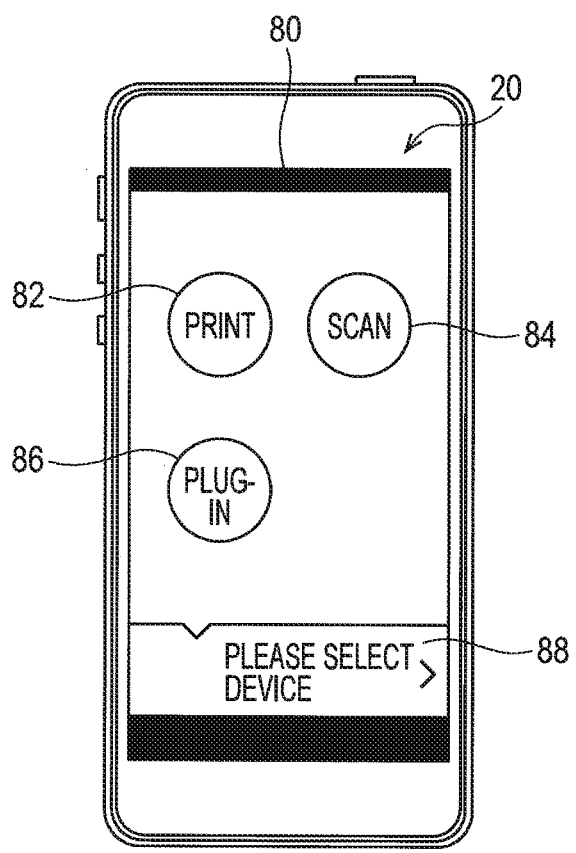
FIG. 3 is a view showing a main screen 80.

In response to an operation of the first select button 74, the control application 30 is started up to display the main screen 80 on the LCD 20 (FIG. 3). On the main screen 80, a print button 82, a scan button 84, a plug-in button 86, and a device select button 88 are displayed. The print button 82 is for creating image data by the processing of the control application 30 and for causing the MFP to perform printing based on the image data. The scan button 84 is for causing the MFP to perform scan processing. The plug-in button 86 is for starting the plug-in 32, causing the plug-in 32 to create image data, and causing the MFP to perform printing based on the image data. The device select button 88 is for selecting an MFP to perform printing or scanning For example, the plug-in 32 creates image data that does not depend on the model of the MFP, and the control application 30 creates image data for printing (print image data) for a particular model of the MFP.

Figure 4:
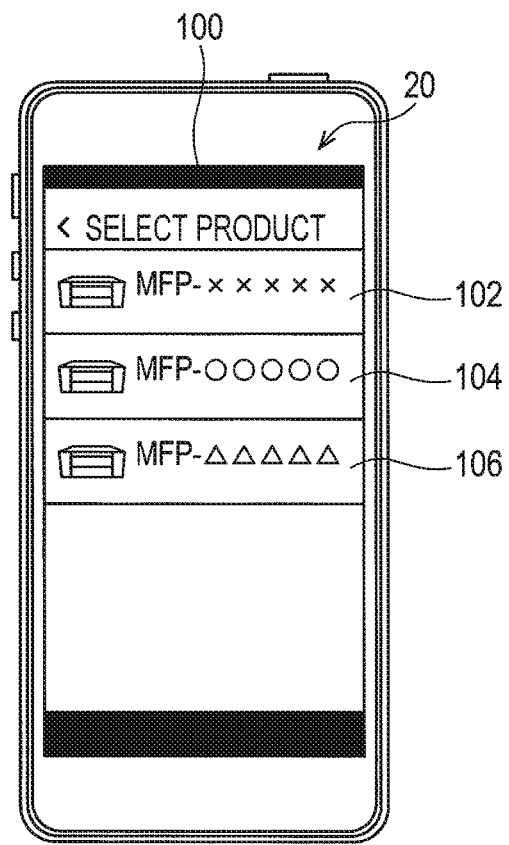
FIG. 4 is a view showing a device selection screen 100.

In response to an operation of the device select button 88 on the main screen 80, the control application 30 displays a device selection screen 100 on the LCD 20 (FIG. 4). The device selection screen 100 displays select buttons 102, 104, 106 for selecting any one of devices configured to communicate with the mobile phone 10. As described above, the mobile phone 10 is configured to communicate with the three MFPs 50, 52, 54. The select button 102 is for selecting the MFP 50, the select button 104 is for selecting the MFP 52, and the select button 104 is for selecting the MFP 54. When one device is selected by the operation of any one of the select buttons 102, 104, 106, the main screen 80 instead of the device selection screen 100 is displayed on the LCD 20. Hereinafter, a case of the MFP 52 being selected by operating the select button 104 will be described.

When the plug-in button 86 is operated on the main screen 80 in a state where one of the devices, that is MFP 52 in this example, is selected on the device selection screen 100, the control application 30 acquires, from the data storage area 34, information relating to the printing specification (hereinafter, refer to as "specification information") of the selected device (hereinafter, refer to as "selected device") on the device selection screen 100. The data storage area 34 stores specification information of each of the MFPs 50, 52, 54. Specifically, as the MFP 50 is configured to perform full-color printing, "full-color" is stored as the specification information of the MFP 50. As the MFP 52 is configured to perform two-color printing, "two-color" is stored as the specification information of the MFP 52. As the MFP 54 is configured to perform only monochromatic printing, "monochromatic" is stored as the specification information of the MFP 54. Since the MFP 52 is selected in this example, the control application 30 acquires "two-color" as the specification information. The specification information stored in the data storage area 34 is the specification information of the MFPs 50, 52, 54 which has been received from the MFPs 50, 52, 54 by the control application 30 during the previous communication and stored in the data storage area 34.

Upon acquiring the specification information of the selected device, the control application 30 outputs a startup command for starting up the plug-in 32. The startup command includes the specification information of the selected device. The plug-in 32 starts up in accordance with the startup command outputted by the control application 30. In other words, due to the operation to the plug-in button 86 on the main screen 80, the control application 30 starts up the plug-in 32. When started up, the plug-in 32 receives the specification information included in the startup command and stores the specification information in the data storage area 34. The control application 30 outputs the startup command to start up the plug-in 32 by using API of the OS (not shown). In other words, by using the API of the OS, the startup command is outputted from the control application 30 to the plug-in 32.

The plug-in 32 displays on the LCD 20 a creation screen (not shown) on which an image corresponding to the specification information can be created. In other words, as the plug-in 32 has received the specification information "two-color" from the control application 30, the plug-in 32 displays on the LCD 20 a creation screen for creating a two-color image. In a case where the plug-in 32 has received the specification information "full-color" from the control application 30, the plug-in 32 displays on the LCD 20 a creation screen for creating a full-color image. In a case where the plug-in 32 has received the specification information "monochromatic", the plug-in 32 displays on the LCD 20 a creation screen for creating a monochromatic image.

Upon receiving a user operation on the creation screen, the plug-in 32 creates image data. As the creation screen is configured to create an image according to the specification information, image data corresponding to the specification information, that is, image data for a two-color image is formed by the user operation to the creation screen. The creation screen has a preview button, and an image based on the created image data is displayed on the LCD 20 as a preview image by operating the preview button. However, the plug-in 32 cannot display the preview image on the LCD 20. Thus, upon receiving an operation on the preview button, the plug-in 32 outputs the created image data to the control application 30. At this timing, the specification information used for creating the image data, that is, the specification information "two-color" is also outputted to the control application 30 together with the image data. The specification information outputted together with the image data is used for creating image data. Thus, the specification information outputted with the image data is referred to as "data creation information". In other words, the plug-in 32 outputs the data creation information "two-color" to the control application 30 together with the image data of a two-color image. Here, the plug-in 32 outputs the image data and the data creation information to the control application 30 by using API of the OS. In other words, by using the API of the OS, the image data and the data creation information are outputted from the plug-in 32 to the control application 30.

Upon receiving the image data and the data creation information, the control application 30 again acquires the specification information of the selected device from the data storage area 34. In other words, as the selected device is the MFP 52, the control application 30 acquires the specification information "two-color". Then, the control application 30 determines whether the data creation information received from the plug-in 32 matches the specification information of the selected device acquired from the data storage area 34. In this example, the control application 30 has received the specification information "two-color" from the plug-in 32 and the specification information of the selected device is "two-color". Thus, it is determined that the data creation information and the specification information match each other. By this determination, it turns out that the image printing based on the image data created at the plug-in 32 can be performed by the selected device.

Figure 5:
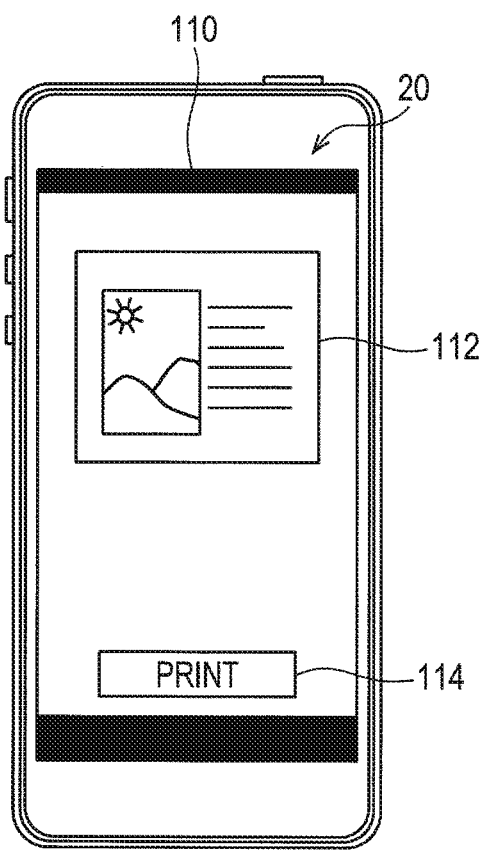
FIG. 5 is a view showing a preview screen 110.

In a case where the data creation information and the specification information match each other, the control application 30 displays the preview screen 110 shown in FIG. 5 on the LCD 20. The preview screen 110 shows a print button 114 and a preview image 112 that is based on the image data received by the control application 30 from the plug-in 32. When the print button 114 is operated on the preview screen 110, the control application 30 creates print image data (print image data) based on the received image data. Then, the control application 30 transmits the print image data to the selected device, that is, to the MFP 52. In other words, the print image data for the "two-color" image is transmitted to the MFP 52 configured to perform two-color printing. In this way, the print processing corresponding to the specification of the selected device is performed appropriately.

In the above-described case, the plug-in button 86 is operated on the main screen 80 after a device is selected. In another case, the plug-in button 86 may be operated on the main screen 80 before a device is selected. In a case where the plug-in button 86 is operated on the main screen 80 after a device is selected as described above, the control application 30 acquires the specification information of the selected device from the data storage area 34. However, if the plug-in button 86 is operated in a state where no device is selected, the control application 30 cannot acquire the specification information of the selected device from the data storage area 34. Because of this, if the plug-in button 86 is operated in a state where no device is selected, the control application 30 acquires tentative specification information.

The tentative specification information is programmed in the control application 30. The tentative specification includes specification information "full-color", "two-color", and "monochromatic". Upon acquiring the tentative specification information from the data storage area 34, the control application 30 outputs a startup command for starting up the plug-in 32. The startup command includes the tentative specification information. In response to the startup command outputted from the control application 30, the plug-in 32 is started up. When started up, the plug-in 32 receives the tentative specification information included in the startup command and displays, on the LCD 20, a screen for selecting any one of the specification information included in the tentative specification information.

In other words, the plug-in 32 displays on the LCD 20 a color setting screen (not shown) for performing color setting corresponding to any one of the specification information "full-color", "two-color", and "monochromatic" included in the tentative specification information. The color setting screen shows a button for performing full-color setting, a button for performing two-color setting, and a button for performing monochromatic setting. When any one of the buttons is operated by the user on the color setting screen, the plug-in 32 stores, in the data storage area 34, the color setting corresponding to the operated button as the specification information. A case will be described below in which a button for performing the full-color setting is operated on the color setting screen and the plug-in 32 stores the specification information "full-color" in the data storage area 34.

Once the specification information "full-color" is stored in the data storage area 34, the plug-in 32 displays, on the LCD 20, a creation screen for creating a full-color image. With the user operation to the creation screen, the plug-in 32 creates image data. Here, the plug-in 32 creates image data of a full-color image. When the preview button is operated on the creation screen, the plug-in 32 outputs, to the control application 30, the created image data and the specification information used for creating the image data, that is, the data creation information. Thus, the plug-in 32 outputs, to the control application 30, the data creation information "full-color" together with the image data of the full-color image.

If a device has already been selected when the control application 30 receives the image data and the data creation information from the plug-in 32, the control application 30 acquires the specification information of the selected device from the data storage area 34. However, since no device has been selected at this time, the specification information of the selected device cannot be acquired. So, the control application 30 searches for a device having the same specification as the data creation information among devices that communicate with the mobile phone 10. In other words, since the control application 30 has received the data creation information "full-color", the control application 30 searches for a device configured to perform full-color printing. For this search, the specification information stored in the data storage area 34 is used.

Specifically, the control application 30 determines whether the specification information "full-color" exists. If the specification information "full-color" exists, the control application 30 determines whether communication with the device of that specification information is possible. If the communication with the device of the specification information "full-color" is possible, the search for the device having the same specification as the data creation information is successful (that is, a device is found). As another method for searching a device, the control application 30 acquires specification information from a device with which communication is possible and, if one of the acquired specification information has the same information as the data creation information received from the plug-in 32, the search for the device having the same specification as the data creation information is successful.

If the search for the device having the same specification as the data creation information is successful, that is, if the search for the MFP 50 that performs full-color printing is successful, the control application 30 displays a selection screen (not shown) on the LCD 20. The selection screen displays select buttons for selecting either printing by using the device (that is, the MFP 50) found by the search (hereinafter, referred to as "found device"), or printing with change of color setting. Here, if the user wishes full-color printing and selects the select button for printing by using the MFP 50, the control application 30 displays, on the LCD 20, a preview screen 110 in which a preview image 112 is displayed based on the image data received from the plug-in 32.

By operating the print button 114 on the preview screen 110, print image data is created and the created print image data is transmitted to the selected device, that is, to the MFP 50. In this way, the full-color printing desired by the user is performed in the MFP 50.

If the user does not wish to perform full-color printing and operates the select button for changing the color setting and performing printing, setting buttons for selecting color setting are displayed. Once the color setting has been performed by operating the setting button, the control application 30 outputs, to the plug-in 32, specification information corresponding to the color setting that is set by the operation on the setting button. At this time, for example, if the button for two-color setting is operated, the control application 30 outputs the specification information "two-color" to the plug-in 32. Then, the plug-in 32 creates image data of a two-color image and outputs, to the control application 30, the image data and the data creation information "two-color". Then, the control application 30 performs searching for the device, displaying the selection screen, creation and transmission of the print image data, so that the two-color printing desired by the user is performed by the MFP 52.

If searching for a device having the same specification as the data creation information failed, in other words, if such a device cannot be found, printing cannot be performed based on the image data received from the plug-in 32. Thus, the control application 30 outputs, to the plug-in 32, specification information different from the data creation information received from the plug-in 32. For example, when searching for a device, there is a case that a device having the same specification as the data creation information is not found but another device having a different specification from the data creation information is found. In such a case, the control application 30 acquires the specification information from the device of which specification is different from the data creation information and then outputs the specification information to the plug-in 32. Then, the plug-in 32 creates image data of the color setting corresponding to the specification of a device that communicates with the mobile phone 10, and outputs the image data to the control application 30. After that, the control application 30 performs searching for a device, displaying the selection screen, creation and transmission of print image data. Thus, printing is reliably performed in a device that communicates with the mobile phone 10.

In addition, for example, when the control application 30 outputs, to the plug-in 32, specification information different from the data creation information received from the plug-in 32, the control application 30 may output, to the plug-in 32, the lowest-level specification information, that is, the specification information "monochromatic". According to this, the plug-in 32 creates image data of a monochromatic image and outputs the same to the control application 30. The monochromatic printing can usually be performed in any printing device. Thus, by performing, in the control application 30, searching for a device, displaying the selection screen, creation and transmission of the print image data, any one of the devices that communicate with the mobile phone 10 can perform printing.

In the above, a case is described in which the first select button 74 is operated in the home screen 70. A case is described below in which the second select button 76 is operated in the home screen 70. When the second select button 76 is operated, the plug-in 32 is started up. That is, when the first select button 74 is operated, the control application 30 is started up and the startup command from the control application 30 starts up the plug-in 32. When the second select button 76 is operated, the plug-in 32 starts up directly.

In a case where the plug-in 32 is started up by the startup command of the control application 30, the plug-in 32 receives the specification information or the tentative specification information included in the startup command. On the other hand, in a case where the plug-in 32 is started up by the operation of the second select button 76, there is no startup command from the control application 30 and thus the plug-in 32 does not acquire the specification information nor the tentative specification information. So, in a case where the plug-in 32 is started up by the operation to the second select button 76, in other words, in a case where the plug-in 32 has received neither the specification information nor the tentative specification information, the plug-in 32 inquires the control application 30 about specification information.

In response to receiving inquiry from the plug-in 32 about the specification information in a case where a device is selected, the control application 30 outputs the specification information of the selected device to the plug-in 32. In response to receiving inquiry from the plug-in 32 about the specification information in a case where no device is selected, the control application 30 outputs tentative specification information to the plug-in 32. In response to receiving the specification information, the plug-in 32 stores the specification information and displays, on the LCD 20, a creation screen for creating an image in accordance with the specification information. In response to receiving the tentative specification information, the plug-in 32 displays a color setting screen on the LCD 20 as described above, and stores the specification information according to the color setting set on the color setting screen. Then, the plug-in 32 displays, on the LCD 20, a creation screen for creating an image in accordance with the specification information.

In the case where no device is selected, the control application 30 outputs, to the plug-in 32, the tentative specification information that is programmed in the control application 30 itself. However, there is a case where the tentative specification information is not programmed in the control application 30. In such a case, the control application 30 does not output the tentative specification information to the plug-in 32, but outputs, to the plug-in 32, only information indicating that no device is selected. In response to receiving the information indicating that no device is selected, the plug-in 32 acquires a specification list.

The specification list is programmed in the plug-in 32. The specification list includes specification information "full-color", specification information "two-color", and specification information "monochromatic". Here, the specification list is the same as the tentative specification information. However, the specification list and the tentative specification information are not necessarily the same, and may be different from each other. In response to acquiring the specification list, the plug-in 32 displays, on the LCD 20, a color setting screen for performing color setting according to any one of the specification information "full-color", "two-color", and "monochromatic". Once any color setting has been performed by a user operation on the color setting screen, the plug-in 32 stores the color setting in the data storage area 34 as the specification information. Then, the plug-in 32 displays, on the LCD 20, a creation screen for creating an image in accordance with the specification information. The procedure after displaying the creation screen is the same as the above described procedure, so the description will be omitted.

In the above description, the control application 30 receives image data and the data creation information from the plug-in 32, acquires the specification information of the selected device from the data storage area 34, determines whether the data creation information and the specification information match, and it is determined that the both information match. Specifically, the MFP 52 is selected as a selected device configured to perform two-color printing and the control application 30 receives the data creation information "two-color" from the plug-in 32, and hence the data creation information and the specification information are determined to be the same. Due to this determination, it turns out that the image based on the image data created in the plug-in 32 can be printed by the selected device. Thus, the preview image 112 based on the image data is displayed on the preview screen 110.

There is another case that, when the control application 30 receives the image data and the data creation information from the plug-in 32 and acquires the specification information of the selected device from the data storage area 34, the acquired specification information and the data creation information do not match. For example, there is a case that the MFP 52 configured to perform two-color printing is selected, but the control application 30 receives the data creation information "full-color" from the plug-in 32, and then it is determined that the data creation information and the specification information do not match. In such a case, the selected device cannot print the image based on the image data created by the plug-in 32. So, in response to receiving image data from the plug-in 32, the control application 30 performs the device search as described above without displaying the preview screen 110.

In other words, the control application 30 searches for a device that communicates with the mobile phone 10 and has the same specification as the data creation information. That is, upon receiving the data creation information "full-color", the control application 30 searches for a device configured to perform full-color printing. When the search for a device having the same specification as the data creation information is successful, the control application 30 displays a selection screen on the LCD 20. As described above, there are select buttons on the selection screen for selecting either printing by using the found device, that is, the MFP 50 configured to perform full-color printing or printing by changing the color setting. In response to receiving an operation to the select button for printing by using the found device, the control application 30 displays the preview screen 110 on the LCD 20 to display the preview image 112 based on the image data received from the plug-in 32. If the print button 114 is operated in the preview screen 110, the selected device is changed into the found device. In other words, although the MFP 52 configured to perform two-color printing has been selected as the selected device, the selected device is changed into the MFP 50 configured to perform full-color printing. Then, the control application 30 creates print image data and transmits the print image data to the changed selected device. In this way, the full-color printing is performed by the MFP 50 configured to perform full-color printing, not by the MFP 52 that is previously selected.

In the above description, in a case where the user does not wish full-color printing and operates a select button for printing by changing the color setting in the selection screen, a setting button for selecting color setting is displayed. Here, as the device is already selected, if the select button for printing by changing the color setting is operated, the control application 30 outputs, to the plug-in 32, the specification information corresponding to the print setting that can be performed by the selected device. Specifically, as the selected device is the MFP 52 configured to perform two-color printing, the control application 30 outputs the specification information "two-color" to the plug-in 32. In response to this, the plug-in 32 creates image data of a two-color image, and outputs the image data and the data creation information "two-color" to the control application 30. Then, the control application 30 performs searching for a device, displaying of the selection screen, creation and transmission of print image data, so that printing is performed by the device that is previously selected by the user.

In a case where a device having the same specification as the data creation information is not found, printing cannot be performed based on the image data received from the plug-in 32. Thus, the control application 30 outputs, to the plug-in 32, specification information different from the data creation information received from the plug-in 32. At this time, the control application 30 outputs, to the plug-in 32, specification information corresponding to the print setting that can be performed by the selected device. Specifically, as the selected device is the MFP 52 configured to perform two-color printing, the control application 30 outputs the specification information "two-color" to the plug-in 32. In response to this, the plug-in 32 creates image data of a two-color image, and outputs the image data and the data creation information "two-color" to the control application 30. Then, the control application 30 performs searching for a device, displaying of the selection screen, creation and transmission of print image data, so that printing is performed by the device that is previously selected by the user.

The above-described print processing is performed by the execution of the control application 30 and the plug-in 32 by the CPU 12. Hereinafter, processing during execution of the flow of the control application 30 will be described by referring to FIGS. 6 to 8, and processing during execution of the flow of the plug-in 32 will be described by referring to FIGS. 9 and 10.

Figure 6:
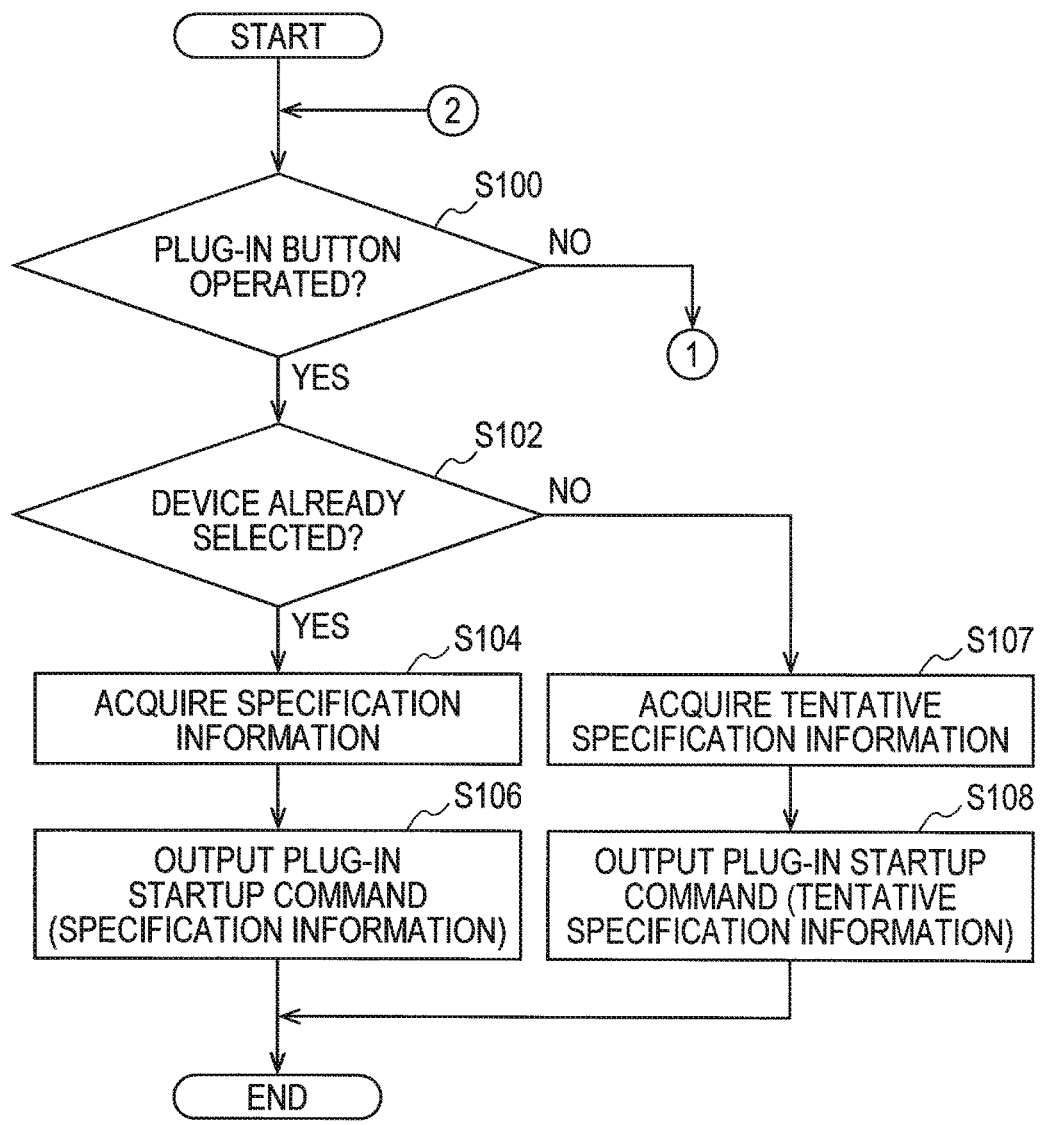
FIG. 6 is a flowchart showing the processing of a control application 30.

As shown in FIG. 6, the control application 30 determines whether the plug-in button 86 is operated. If the plug-in button 86 is operated (S100: YES), the control application 30 determines whether a device is already selected (S102). If a device is selected (S102: YES), the control application 30 acquires specification information of the selected device (S104), and outputs a startup command for starting up the plug-in 32 (S106). Then, this processing ends. On the other hand, if no device is selected (S102: NO), the control application 30 acquires tentative specification information (S107), and outputs a startup command for starting up the plug-in 32, the startup command including the tentative specification information (S108). Then, this processing ends.

Figure 7:
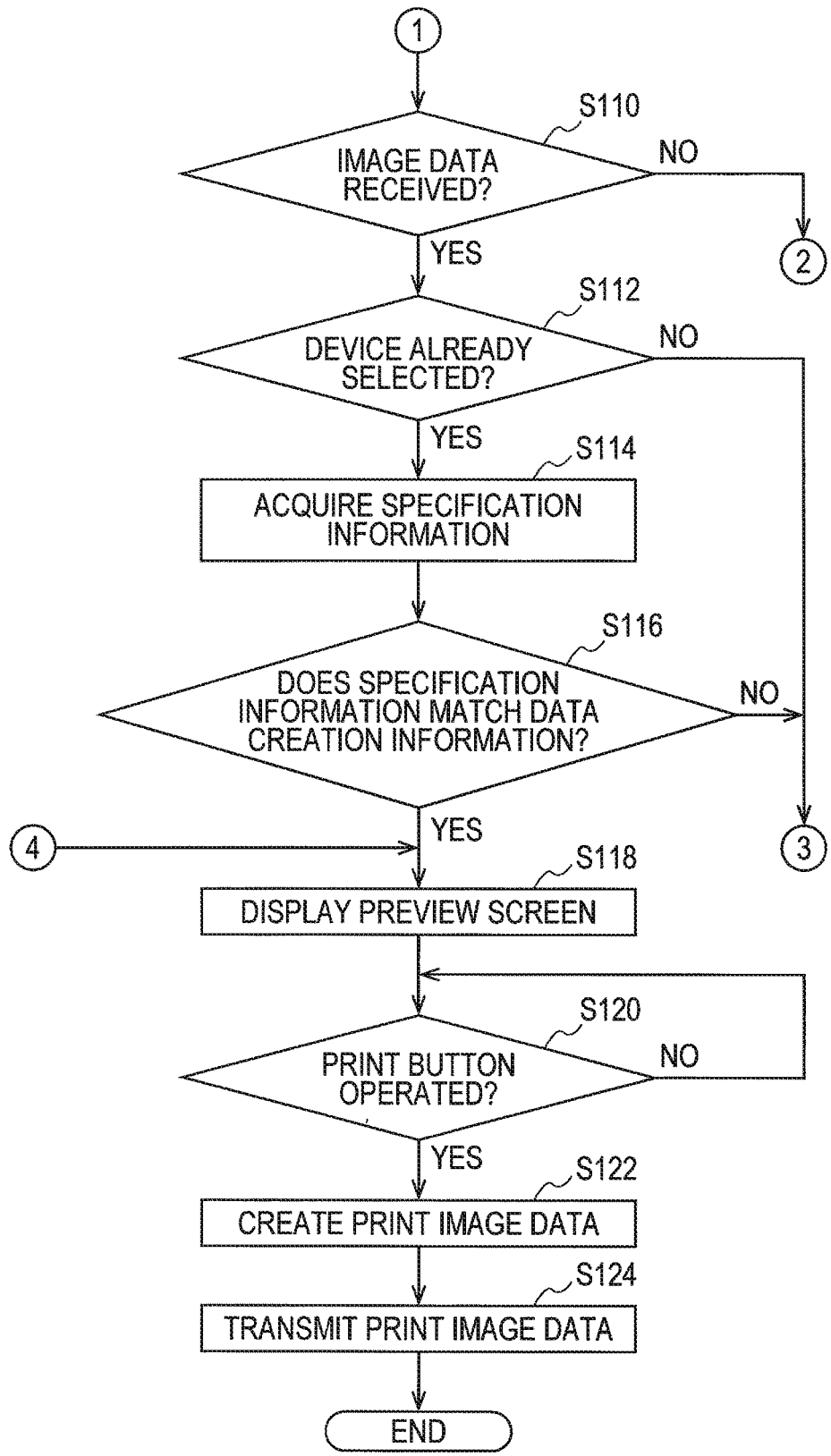
FIG. 7 is a flowchart showing the processing of the control application 30.
Figure 8:
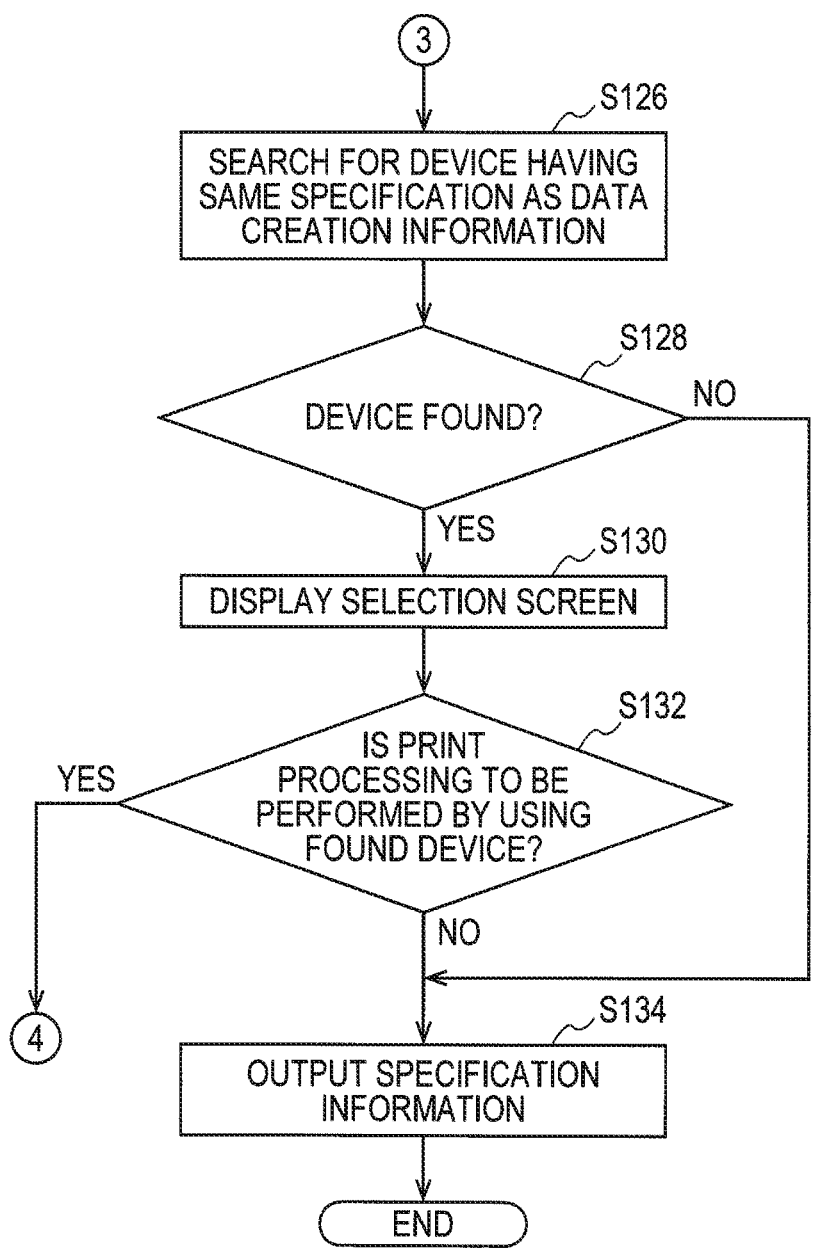
FIG. 8 is a flowchart showing the processing of the control application 30.

In S100, if the plug-in button 86 has not been operated (S100: NO), as shown in FIG. 7, the control application 30 determines whether image data has been received from the plug-in 32. If no image data has been received (S110: NO), the process returns to S100. If image data has been received (S110: YES), the control application 30 determines whether a device is already selected (S112). If a device is selected (S112: YES), the control application 30 acquires the specification information (S114), and determines whether the specification information and the data creation information match (S116).

If the specification information and the data creation information match (S116: YES), the control application 30 displays the preview screen 110 on the LCD 20 (S118). Then, the control application 30 determines whether the print button 114 has been operated on the preview screen 110 (S120). If the print button 114 has not been operated (S120: NO), the processing of S120 is repeated. If the print button 114 has been operated (S120: YES), the control application 30 creates print image data based on the image data received from the plug-in 32 (S122). After that, the control application 30 transmits the created print image data to the selected device (S124). Then, this processing ends.

Further, in a case where no device has been selected (S112: NO) and where the specification information and the data creation information do not match (S116: NO), as seen from FIG. 8, the control application 30 searches for a device having the same specification as the data creation information (S126). Then, the control application 30 determines whether a device is found (S128). If a device is found (S128: YES), the control application 30 displays the selection screen on the LCD 20.

Next, the control application 30 determines whether a select button for printing by using the found device ("first select button") has been operated on the selection screen (S132). If the first select button has been operated (S132: YES), the process moves to S118. If the first select button has not been operated (S132: NO), in other words, if a select button for printing by changing the color setting ("second select button") has been operated, the control application 30 outputs the specification information to the plug-in 32 (S134). For example, if a device is already selected, the control application 30 outputs, to the plug-in 32, the specification information corresponding to the print setting that can be performed by the selected device. For example, if no device is selected, the control application 30 outputs, to the plug-in 32, the specification information corresponding to the color setting that is set on the selection screen. Then, this processing ends.

In S128, if no device having the same specification as the data creation information is found (S128: NO), the control application 30 outputs specification information to the plug-in 32 (S134). For example, if a device is selected, the control application 30 outputs, to the plug-in 32, the specification information corresponding to the print setting that can be performed by the selected device. For example, if no device is selected, the control application 30 outputs, to the plug-in 32, the specification information corresponding to the print setting that can be performed by the found device. Then, this processing ends.

Figure 9:
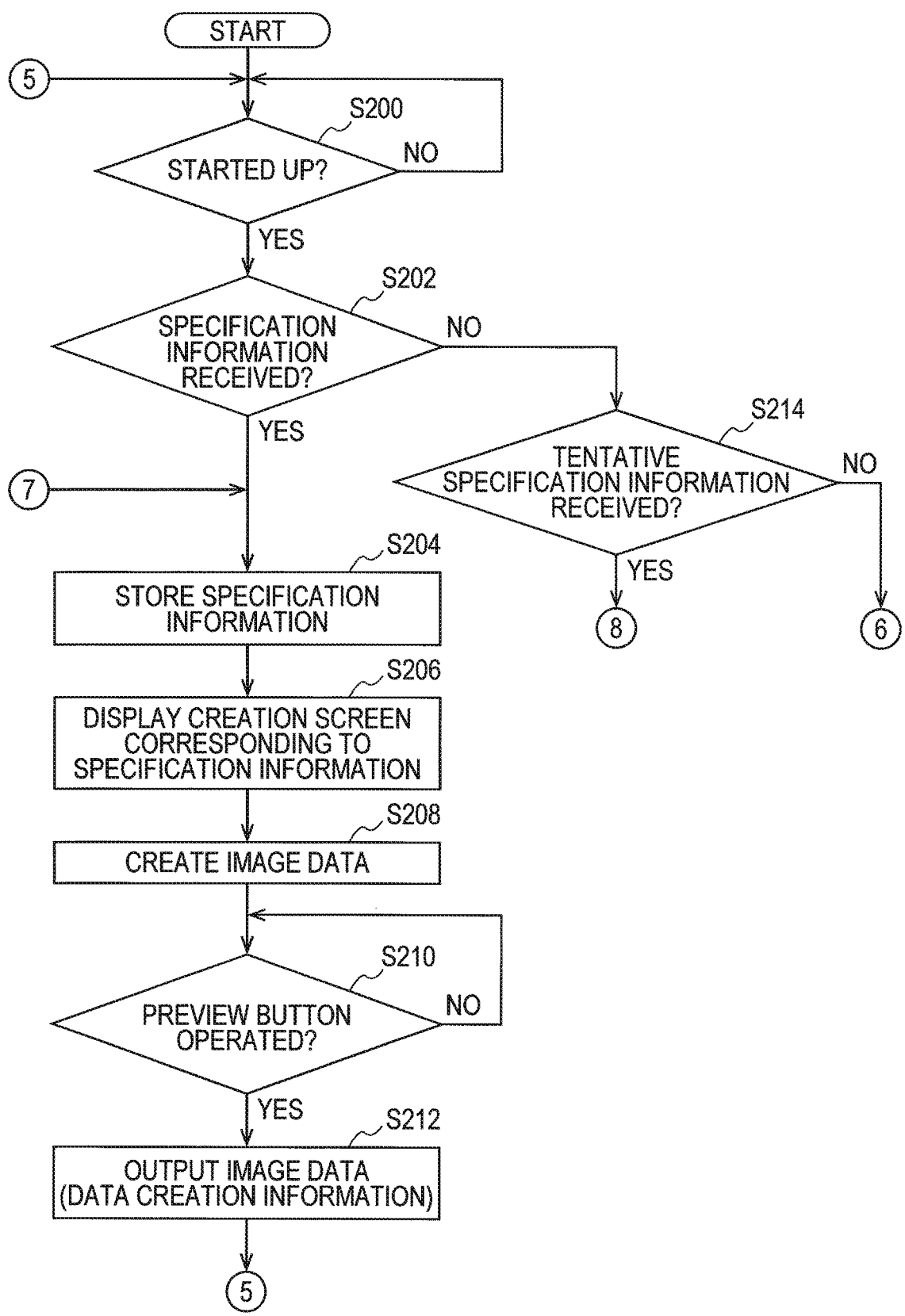
FIG. 9 is a flowchart showing the processing of a plug-in 32.

As shown in FIG. 9, the plug-in 32 determines whether the plug-in 32 has started up (S200). If the plug-in 32 has not started up (S200: NO), the processing of S200 is repeated. If the plug-in 32 has started up (S200: YES), the plug-in 32 determines whether the plug-in 32 has received specification information (S202). If the plug-in 32 has received specification information (S202: YES), the plug-in 32 stores the specification information in the data storage area 34 (S204). Then, the plug-in 32 displays, on the LCD 20, a creation screen corresponding to the specification information (S206).

After that, the plug-in 32 creates image data in response to the user operation to the creation screen (S208). Then, the plug-in 32 determines whether the preview button has been operated (S210). If the preview button has not been operated (S210: NO), the processing of S210 is repeated. If the preview button has been operated (S210: YES), the plug-in 32 outputs, to the control application 30, the image data and the data creation information (S212). Then, the processing returns to S200.

In S202, if no specification information has been received (S202: NO), the plug-in 32 determines whether tentative specification information has been received (S214). If no tentative specification information has been received (S214: NO), the plug-in 32 outputs, to the control application 30, an inquiry regarding the specification information (S216). At this time, the plug-in 32 determines whether the specification information has been received (S218). If the plug-in 32 has received the specification information (S218: YES), the processing moves to S204. If no specification information has been received (S218: NO), the plug-in 32 determines whether tentative specification information has been received (S220). If no tentative specification information has been received (S220: NO), the plug-in 32 acquires a specification list (S222), and proceeds to S224. If the tentative specification information has been received in S214 (S214: YES), the processing also proceeds to S224.

In S224, the plug-in 32 displays, on the LCD 20, a color setting screen based on the tentative specification information or the specification list (S224). Then, the plug-in 32 determines whether color setting has been performed on the color setting screen (S226). If color setting has not been performed (S226: NO), the processing of S226 is repeated. If the color setting has been performed (S226: YES), the processing proceeds to S204. That is, the plug-in 32 stores the specification information corresponding to the color setting in the data storage area 34. Thereafter, the subsequent processing is executed. According to the above-described processing, image data corresponding to specification information indicative of the specification of the MFP (image processing device) can be created appropriately.

Note that the CPU 12 executing S106 and S108 is an example of third output means. The CPU 12 executing S110 is an example of second reception means. The CPU 12 executing S126 is an example of search means. The CPU 12 executing S134 is an example of fourth output means. The CPU 12 executing S202 is an example of first reception means. The CPU 12 executing S206 is an example of display control means. The CPU 12 executing S208 is an example of creation means. The CPU 12 executing S212 is an example of first output means. The CPU 12 executing S216 is an example of second output means. The CPU 12 executing S224 is an example of notification means.

While the disclosure has been described in detail with reference to the above aspects thereof, it would be apparent to those skilled in the art that various changes and modifications may be made therein without departing from the scope of the claims.

For example, in the above-described embodiment, specification information is stored in the data storage area 34, and the control application 30 acquires the specification information from the data storage area 34. Alternatively, when specification information is needed, the control application 30 may acquire the specification information from a device by communicating with the device.

In the above-described embodiment, each of the tentative specification information and the specification list includes specification information corresponding to all the devices. Alternatively, each of the tentative specification information and the specification list may include one specification information that is common to all the devices. In other words, in the above-described embodiment, each of the tentative specification information and the specification list includes specification information "full-color", "two-color", and "monochromatic". Alternatively, each of the tentative specification information and the specification list may include only the specification information "monochromatic" which indicates a common specification to the MFP 50 configured to perform full-color printing, the MFP 52 configured to perform two-color printing, and the MFP 54 configured to perform only monochromatic printing.

In the above-described embodiment, the information directly indicating color setting such as "full-color" is used as specification information. Alternatively, the information indirectly indicating color setting may be used. For instance, if a model name is associated with its specification, the model name of the device may be used as specification information.

In the above-described embodiment, in a case where no device having the same specification as the data creation information is found, the control application 30 outputs, to the plug-in 32, new specification different from the data creation information and then the plug-in 32 creates image data corresponding to the new specification information. Alternatively, in the case where no device having the same specification as the data creation information is found, the control application 30 may display an error screen on the LCD 20 without outputting new specification information.

In the above-described embodiment, the tentative specification information is programmed in the control application 30 while the specification list is programmed in the plug-in 32. Alternatively, the control application 30 or the plug-in 32 may acquire the tentative specification information or the specification list from a storage device such as a server. In such a case, the control application 30 or the plug-in 32 may be programmed to acquire the tentative specification information or the specification list from the storage device such as a server.

In the above-described embodiment, the information related to color setting for print processing is adopted as the specification information. Other specification information such as the print paper size and the print resolution may be adopted. The specification information is not limited to the print processing. The specification information regarding various processing such as scan processing, image display processing, and facsimile processing may be adopted.

Figure 10:
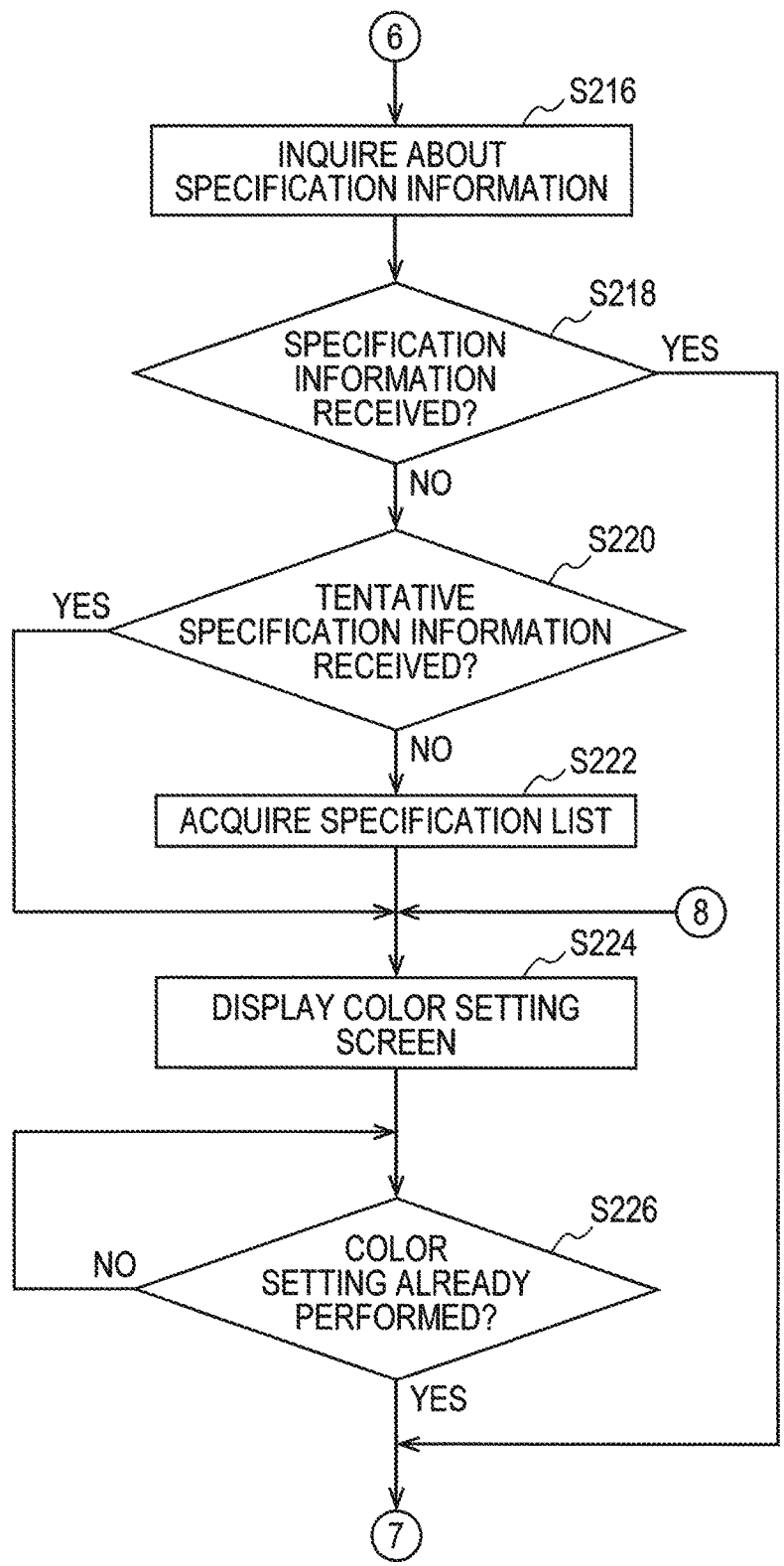
FIG. 10 is a flowchart showing the processing of the plug-in 32.

In the above-described embodiment, the CPU 12 executes the processing shown in FIGS. 6 and 10. These processing is not necessarily executed by the CPU 12 but may be executed by an ASIC or other logic integrated circuit or may be executed by a CPU, an ASIC, and other logic integrated circuits in cooperation with one another.

What is claimed is:

1. A non-transitory computer-readable storage medium storing a creation program including a set of instructions readable by a computer of an information processing apparatus, the set of instructions, when executed by the computer, causing the information processing apparatus to perform:
   receiving, from a transmission program, specification information indicative of a specification of an image processing device configured to communicate with the information processing apparatus, the transmission program being readable by the computer and being different from the creation program;
   creating first image data corresponding to the specification information received from the transmission program, the first image data being image data that is created by the creation program and that is transmitted to the transmission program; and
   outputting the first image data to the transmission program, the transmission program being configured to transmit second image data to the image processing device, the second image data being image data that is created by the transmission program based on the first image data and that is transmitted to the image processing device;

outputting, to the transmission program, data creation information in addition to the first image data, the data creation information being specification information that has been used for creating the first image data, the transmission program being configured to:

determine whether the data creation information received from the creation program matches the specification information acquired from the memory;

in response to determining that the data creation information received from the creation program matches the specification information acquired from the memory, create the second image data and transmitting the second image data to the image processing device, the second image data being image data that is created by the transmission program based on the first image data and that is transmitted to the image processing device; and in response to determining that the data creation information received from the creation program does not match the specification information acquired from the memory, search for an another image processing device having a specification indicated by the data creation information received from the creation program; and in response to finding the another image processing device having the specification indicated by the data creation information, create the second image data and transmit the second image data to the another image processing device.

2. The non-transitory computer-readable storage medium according to claim 1, wherein the creation program is configured to start up in response to a startup command transmitted from the transmission program; and wherein the set of instructions, when executed by the computer, causes the information processing apparatus to perform:

receiving, from the transmission program, the specification information together with the startup command.

3. The non-transitory computer-readable storage medium according to claim 1, wherein the set of instructions, when executed by the computer, causes the information processing apparatus to perform:

outputting, to the transmission program, an inquiry about the specification information; and receiving the specification information from the transmission program in response to the inquiry.

4. The non-transitory computer-readable storage medium according to claim 1, wherein the set of instructions, when executed by the computer, causes the information processing apparatus to perform:

receiving, from the transmission program, tentative specification information including one or more specification information;

outputting, through a user interface, the one or more specification information included the tentative specification information in such a manner that one of the one or more specification information is selectable; and receiving, through the user interface, a selected one of the one or more specification information.

5. The non-transitory computer-readable storage medium according to claim 1, wherein the creation program is programmed to acquire a specification list including one or more specification information; and wherein the set of instructions, when executed by the computer, causes the information processing apparatus to perform:

outputting, through a user interface, one or more specification information included the specification list in such a manner that one of the one or more specification information is selectable; and receiving, through the user interface, a selected one of the one or more specification information.

6. The non-transitory computer-readable storage medium according to claim 1, wherein the set of instructions, when executed by the computer, causes the information processing apparatus to perform:

displaying, on a display interface of the information processing apparatus, a creation screen for creating the first image data corresponding to the specification information received from the transmission program; and creating the first image data in response to an operation to the creation screen.

7. A non-transitory computer-readable storage medium storing a transmission program including a set of instructions readable by a computer of an information processing apparatus, the set of instructions, when executed by the computer, causing the information processing apparatus to perform:

outputting, to a creation program, specification information indicative of a specification of an image processing device configured to communicate with the information processing apparatus, the creation program being readable by the computer and being different from the transmission program, the creation program being for creating first image data, the first image data being image data that is created by the creation program and that is transmitted to the transmission program;

receiving the first image data from the creation program, the first image data being created by the creation program by using the specification information; and transmitting second image data to the image processing device, the second image data being image data that is created by the transmission program based on the first image data and that is transmitted to the image processing device;

receiving, from the creation program, data creation information in addition to the first image data, the first image data being created by the creation program by using the specification information, the data creation information being the specification information that has been used for creating the first image data by the creation program;

determining whether the data creation information received from the creation program matches the specification information acquired from the memory;

in response to determining that the data creation information received from the creation program matches the specification information acquired from the memory, creating the second image data and transmitting the second image data to the image processing device, the second image data being image data that is created by the transmission program based on the first image data and that is transmitted to the image processing device; and in response to determining that the data creation information received from the creation program does not match the specification information acquired from the memory, searching for an another image processing device having a specification indicated by the data creation information received from the creation program; and in response to finding the another image processing device having the specification indicated by the data creation information, creating the second image data and transmitting the second image data to the another image processing device.

8. The non-transitory computer-readable storage medium according to claim 7, wherein the set of instructions, when executed by the computer, causes the information processing apparatus to perform:

in response to finding no image processing device having the specification indicated by the data creation information, outputting, to the creation program, specification information different from the data creation information received from the creation program.

9. The non-transitory computer-readable storage medium according to claim 7, wherein the set of instructions, when executed by the computer, causes the information processing apparatus to perform: in response to finding no image processing device having the specification indicated by the data creation information, outputting, to the creation program, specification information different from the data creation information received from the creation program.

10. The non-transitory computer-readable storage medium according to claim 7, wherein the set of instructions, when executed by the computer, causes the information processing apparatus to perform:

in response to receiving an operation to start up the creation program, determining whether the image processing device is selected;

in response to determining that the image processing device is selected, acquiring the specification information of the selected image processing device, and outputting a first startup command for starting up the creation program, the first startup command including the specification information of the selected image processing device; and in response to determining that no image processing device is selected, acquiring tentative specification information, and outputting a second startup command for starting up the creation program, the second startup command including the tentative specification information, the tentative specification information including one or more specification information that is outputted, by the creation program, in such a manner that one of the one or more specification information is selectable.

11. An information processing apparatus comprising:
a communication interface configured to communicate with an image processing device;
a user interface;
a controller; and
a memory storing a transmission program and a creation program different from each other, each of the transmission program and the creation program including instructions, the instructions, when executed by the controller, causing the information processing apparatus to perform:

outputting, from the transmission program to the creation program, specification information indicative of a specification of the image processing device; receiving, by the creation program, the specification information;
creating, by the creation program, first image data corresponding to the specification information received from the transmission program, the first image data being image data that is created by the creation program and that is transmitted to the transmission program; outputting the first image data from the creation program to the transmission program;

receiving, by the transmission program, the first image data that is created and outputted by the creation program; and transmitting second image data from the transmission program to the image processing device through the communication interface, the second image data being image data that is created by the transmission program based on the first image data and that is transmitted to the image processing device;

outputting data creation information in addition to the first image data from the creation program to the transmission program, the data creation information being the specification information that has been used for creating the first image data by the creation program;

receiving, by the transmission program, the data creation information in addition to the first image data from the creation program;

determining, by the transmission program, whether the data creation information received from the creation program matches the specification information acquired from the memory;

in response to determining that the data creation information received from the creation program matches the specification information acquired from the memory, creating, by the transmission program, the second image data and transmitting the second image data to the image processing device, the second image data being image data that is created by the transmission program based on the first image data and that is transmitted to the image processing device; and in response to determining that the data creation information received from the creation program does not match the specification information acquired from the memory, searching, by the transmission program, for an another image processing device having a specification indicated by the data creation information received from the creation program; and in response to finding the another image processing device having the specification indicated by the data creation information, creating the second image data and transmitting the second image data from the transmission program to the another image processing device through the communication interface.

12. The information processing apparatus according to claim 11, wherein the creation program is configured to start up in response to a startup command transmitted from the transmission program; and wherein the set of instructions, when executed by the controller, causes the information processing apparatus to perform:
receiving, by the creation program, the specification information together with the startup command from the transmission program.

13. The information processing apparatus according to claim 11, wherein the set of instructions, when executed by the controller, causes the information processing apparatus to perform:

outputting, from the creation program to the transmission program, an inquiry about the specification information; and receiving, by the creation program, the specification information that is outputted by the transmission program in response to the inquiry.

14. The information processing apparatus according to claim 11, wherein the set of instructions, when executed by the controller, causes the information processing apparatus to perform:

receiving, by the creation program, tentative specification information including one or more specification information outputted from the transmission program;

outputting, by the creation program, through the user interface, the one or more specification information included the tentative specification information in such a manner that one of the one or more specification information is selectable; and receiving, by the creation program, through the user interface, a selected one of the one or more specification information.

15. The information processing apparatus according to claim 11, wherein the creation program is programmed to acquire a specification list including one or more specification information;

wherein the set of instructions, when executed by the controller, causes the information processing apparatus to perform:

outputting, by the creation program, through the user interface, the one or more specification information included the specification list in such a manner that one of the one or more specification information is selectable; and receiving, by the creation program, through the user interface, a selected one of the one or more specification information.

16. The information processing apparatus according to claim 11, wherein the set of instructions, when executed by the controller, causes the information processing apparatus to perform:

in response to finding no image processing device having the specification indicated by the data creation information, outputting, from the transmission program to the creation program, specification information different from the data creation information received from the creation program.

* * * * *